UNITED STATES PATENT OFFICE.

GEORGE W. PECAN, OF BROOKLYN, NEW YORK.

SLATING COMPOUND.

SPECIFICATION forming part of Letters Patent No. 262,112, dated August 1, 1882.

Application filed March 20, 1882. (No specimens.)

*To all whom it may concern:*

Be it known that I, GEORGE W. PECAN, of Brooklyn, in the county of Kings and State of New York, have invented a certain new and Improved Slating Compound, of which the following is a specification.

My improved compound may be applied to wood, paper, or any other surface for making an artificial slate-surface, but it is particularly adapted for metallic surfaces, such as sheet metal; and an important object of the invention is to provide a compound which, when applied to iron or tin plates for making school-slates, will not readily crack or break, even though the slate be bent or dented.

My improved compound is composed of pumice-stone, dyed to give it a dark color, and subsequently dried, and a binding-menstruum, which consists of an alcoholic solution of shellac and oil.

For dyeing the pumice-stone, I may employ an infusion of logwood in water, together with vinegar in which iron has been immersed, as hereinafter more fully described. The pumice-stone which I employ is in a finely-powdered state.

In preparing the infusion of logwood to make a dye, I take about one pound of logwood, to which I add five pints of water, and I then boil until only about three pints of liquid remain. I then take about one pound of iron-scrap, preferably scrap which is rusty, and immerse it in about two pints of vinegar, where I leave it for one day or more. The infusion of logwood and vinegar in which the iron has been immersed are then both strained.

To dye the pumice-stone, I take about two pounds of the powdered stone and on it pour the three pints of the infusion of logwood and about one pint of the vinegar containing iron. After the dye is thoroughly united with the pumice-stone, by stirring or otherwise, I dry the dyed stone in an oven or by exposure to the air.

In preparing my binding menstruum, I take about one pound of gum-shellac and dissolve it in about one quart of alcohol of ninety-five per cent. proof, which will give about one quart and one-half pint of shellac solution. To this quantity of shellac solution I add about one pint of boiled linseed-oil, and I then add the menstruum of shellac solution and oil to the two pounds of dyed and dried pumice-stone, and thoroughly incorporate and mix them by stirring or otherwise. If this compound becomes thickened after it is prepared, it may be thinned for use by adding from time to time sufficient boiled linseed-oil to bring it to the consistency required.

This compound may be applied with a brush or otherwise to the surfaces of wood for making blackboards, or to paper, sheet metal, or any other suitable fabric or material, and one, two, or more coats may be put on, as may be desired. In putting on the last or finishing coat, I may use the compound thinned by adding a little additional oil.

Although I have found the proportions above stated to be very desirable, they may be varied as is found to be necessary or desirable.

The dye composed of an infusion of logwood and vinegar with iron is very desirable, as it does not cake the pumice-stone, but other dyes may be used, and the menstruum, also, may be varied as may be required.

The above-described slating compound is very desirable, as it is very tough and elastic and will not readily crack or break, even though the metal or other surfaces to which it is applied be dented or bent. This renders the compound very desirable for making school-slates, by simply coating iron or tin plate with the compound.

To enable the compound to have a more intimate contact with them, plates to be slated, when made of tin-plate, may be dipped in muriatic acid before applying the compound.

Pumice-stone has frequently been used in slating compounds, and hence I make no broad claim thereto; but heretofore where a compound of dark color has been required lamp-black or other coloring-matter has been added to the compound. My compound is materially different from such dark-colored compounds, in that I dye the pumice-stone, and subsequently, and before it is used for mixing in the compound, I thoroughly dry it.

What I claim as my invention, and desire to secure by Letters Patent, is—

1. The slating compound composed of pumice-stone, dyed and subsequently dried, substantially as herein described, and a binding menstruum composed of an alcoholic solution of shellac and oil, for the purpose specified.

2. The slating compound composed of pumice-stone, dyed with an infusion of logwood, and subsequently dried, substantially as herein described, and a binding-menstruum consisting of an alcoholic solution of shellac and oil, for the purpose specified.

GEORGE W. PECAN.

Witnesses:
 FREDK. HAYNES,
 ED. MORAN.